(12) United States Patent
Jukkola et al.

(10) Patent No.: US 9,617,087 B2
(45) Date of Patent: Apr. 11, 2017

(54) CONTROL VALVE AND CONTROL VALVE SYSTEM FOR CONTROLLING SOLIDS FLOW, METHODS OF MANUFACTURE THEREOF AND ARTICLES COMPRISING THE SAME

(75) Inventors: Glen D. Jukkola, Glastonbury, CT (US); Bard C. Teigen, Enfield, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 13/283,355

(22) Filed: Oct. 27, 2011

(65) Prior Publication Data
US 2012/0111243 A1 May 10, 2012

Related U.S. Application Data

(60) Provisional application No. 61/407,706, filed on Oct. 28, 2010, provisional application No. 61/407,741, (Continued)

(51) Int. Cl.
*B65G 53/16* (2006.01)
*B65G 53/18* (2006.01)
(Continued)

(52) U.S. Cl.
CPC .............. *B65G 53/16* (2013.01); *B65G 53/18* (2013.01); *B65G 53/50* (2013.01); *F23C 10/18* (2013.01);
(Continued)

(58) Field of Classification Search
CPC ........ B65G 53/16; B65G 53/18; B65G 53/20; B65G 53/40; B65G 53/50; B65G 53/66;
(Continued)

(56) References Cited

U.S. PATENT DOCUMENTS 2,316,814 A * 4/1943 Schemm ......................... 406/89
2,756,981 A * 7/1956 Muller ............................ 432/58
(Continued)

FOREIGN PATENT DOCUMENTS

CN 1042412 A 5/1990
CN 1279312 C 10/2006
(Continued)

OTHER PUBLICATIONS

U.S. Department of Transportation: Federal Highway Administration. "User Guidelines for Waste and Byproduct Materials in Pavement Construction." <http://www.fhwa.dot.gov/publications/research/infrastructure/structures/97148/cfa53.cfm>. Accessed Jul. 11, 2014.*
(Continued)

*Primary Examiner* — Kenneth Rinehart
*Assistant Examiner* — Tavia Sullens
(74) *Attorney, Agent, or Firm* — GE Global Patent Operation; Stephen G. Midgley

(57) ABSTRACT

Disclosed herein is a solids flow control valve comprising a standpipe; a shoe; and a transport pipe; wherein the standpipe is in operative communication with the shoe and lies upstream of the shoe; the standpipe comprising a first end and a second end, where the first end is in contact with a source that contains disposable solids and the second end is in fluid contact with the shoe; the shoe being operative to restrict the flow of the disposable solids; the transport pipe being disposed downstream of the shoe to receive and transport the solids from the shoe.

23 Claims, 12 Drawing Sheets

Related U.S. Application Data filed on Oct. 28, 2010, provisional application No. 61/407,694, filed on Oct. 28, 2010.

(51) Int. Cl.

| | | |
|---|---|---|
| *B65G 53/50* | (2006.01) | |
| *F23C 10/18* | (2006.01) | |
| *F23C 10/32* | (2006.01) | |
| *F28F 27/02* | (2006.01) | |
| F28C 3/14 | (2006.01) | |
| F28D 13/00 | (2006.01) | |
| F28D 21/00 | (2006.01) | |

(52) U.S. Cl.
CPC .............. *F23C 10/32* (2013.01); *F28F 27/02* (2013.01); *F28C 3/14* (2013.01); *F28D 13/00* (2013.01); *F28D 2021/0045* (2013.01); *Y10T 137/8593* (2015.04)

(58) Field of Classification Search
CPC .......... F23C 10/32; F23C 10/28; F23C 10/24; F23C 10/26; F23C 2900/10008; F23C 10/18; F23C 10/261; F28C 3/14
USPC .................... 110/165 R, 169, 243, 245, 244; 165/104.16; 406/89, 86, 90, 138, 198; 222/195, 189.11, 637; 137/240
See application file for complete search history.

(56) References Cited

U.S. PATENT DOCUMENTS

| | | | |
|---|---|---|---|
| 3,563,006 A | 2/1971 | Sutter | |
| 3,679,271 A * | 7/1972 | Clark et al. ..................... | 406/89 |
| 3,932,173 A | 1/1976 | Collin et al. | |
| 4,084,545 A * | 4/1978 | Nack et al. ................... | 122/4 D |
| 4,279,207 A | 7/1981 | Wormser | |
| 4,307,773 A | 12/1981 | Smith | |
| 4,479,353 A | 10/1984 | Schluderberg | |
| 4,501,599 A | 2/1985 | Loukos | |
| 4,624,305 A | 11/1986 | Rojey | |
| 4,659,340 A | 4/1987 | Weaver | |
| 4,683,840 A * | 8/1987 | Morin ............................ | 122/4 D |
| 4,687,497 A * | 8/1987 | Owen et al. ..................... | 55/349 |
| 4,777,889 A * | 10/1988 | Smith ............................ | 110/245 |
| 4,869,207 A * | 9/1989 | Engstrom et al. .............. | 122/4 D |
| 4,909,676 A * | 3/1990 | Heep et al. ...................... | 406/14 |
| 4,955,295 A * | 9/1990 | Abdulally ....................... | 110/263 |
| 4,969,930 A * | 11/1990 | Arpalahti ...................... | 48/197 R |
| 5,133,943 A * | 7/1992 | Abdulally ....................... | 122/4 D |
| 5,275,788 A * | 1/1994 | Stoholm ......................... | 422/145 |
| 5,339,774 A * | 8/1994 | Tang ......................... | F23C 10/10 |
| | | | 110/215 |
| 5,441,406 A * | 8/1995 | Bunk et al. ...................... | 432/15 |
| 5,676,281 A * | 10/1997 | Reier ............................ | 222/195 |
| 5,682,828 A * | 11/1997 | Phalen et al. ................... | 110/245 |
| 5,711,233 A * | 1/1998 | Martin et al. .............. | 110/165 R |
| 6,076,596 A | 6/2000 | Osakabe et al. | |
| 6,269,778 B1 * | 8/2001 | Anderson et al. ............. | 122/4 D |
| 6,293,112 B1 | 9/2001 | Moeykens et al. | |
| 6,357,517 B1 | 3/2002 | Osakabe et al. | |
| 6,418,866 B1 * | 7/2002 | Shimizu et al. ............... | 110/347 |
| 6,457,425 B1 * | 10/2002 | Crafton ..................... | F23G 5/30 |
| | | | 110/204 |
| 6,589,778 B1 | 7/2003 | Hawkins | |
| 6,684,917 B2 * | 2/2004 | Zhu et al. ...................... | 222/195 |
| 6,764,253 B1 * | 7/2004 | Pfeiffer ........................... | 406/11 |
| 6,868,695 B1 | 3/2005 | Dingel et al. | |
| 6,923,128 B2 * | 8/2005 | Seeber .......................... | 110/245 |
| 7,194,983 B2 * | 3/2007 | Kokko .......................... | 122/4 D |
| 7,329,071 B2 * | 2/2008 | Sonnichsen ............ | B65G 53/18 |
| | | | 406/144 |
| 7,448,831 B2 * | 11/2008 | Brown et al. .................... | 406/90 |
| 7,553,111 B2 * | 6/2009 | Salmento et al. ............... | 406/89 |
| 7,937,943 B2 | 5/2011 | Cao | |
| 8,225,936 B2 * | 7/2012 | Bligh et al. ..................... | 209/154 |
| 2002/0084059 A1 | 7/2002 | Rittberger et al. | |
| 2002/0192039 A1 | 12/2002 | Pfeiffer et al. | |
| 2003/0019612 A1 | 1/2003 | Osakabe et al. | |
| 2003/0037730 A1 | 2/2003 | Yamasaki et al. | |
| 2003/0079863 A1 | 5/2003 | Sugito et al. | |
| 2004/0037658 A1 | 2/2004 | Pfeiffer et al. | |
| 2005/0064357 A1 * | 3/2005 | Watanabe ....................... | 432/14 |
| 2005/0155749 A1 | 7/2005 | Memory et al. | |
| 2005/0205015 A1 | 9/2005 | Sasaki et al. | |
| 2006/0154190 A1 | 7/2006 | Reiser et al. | |
| 2007/0183854 A1 | 8/2007 | Sonnichsen | |
| 2008/0029001 A1 | 2/2008 | Matsui et al. | |
| 2008/0031697 A1 * | 2/2008 | Berggren ........................ | 406/89 |
| 2008/0202735 A1 | 8/2008 | Geskes et al. | |
| 2009/0151902 A1 | 6/2009 | Jacobs et al. | |
| 2009/0304465 A1 | 12/2009 | Greenwood et al. | |
| 2010/0101760 A1 | 4/2010 | Wedde et al. | |
| 2011/0315350 A1 | 12/2011 | Curtis | |
| 2013/0174783 A1 | 7/2013 | Suzuki et al. | |
| 2013/0336860 A1 | 12/2013 | Bjarno | |

FOREIGN PATENT DOCUMENTS

| | | |
|---|---|---|
| CN | 101641462 A | 2/2010 |
| CN | 101754918 A | 6/2010 |
| DE | 1401704 A1 | 10/1968 |
| DE | 1920889 A1 | 11/1970 |
| DE | 196 29 289 A1 | 1/1998 |
| DE | 19723159 C2 | 6/2002 |
| EP | 226140 A * | 6/1987 |
| EP | 0543100 A1 | 5/1993 |
| EP | 1 816 095 A1 | 8/2007 |
| GB | 1102264 A | 2/1968 |

OTHER PUBLICATIONS

U.S. Department of Transportation: Federal Highway Administration. "User Guidelines for Waste and Byproduct Materials in Pavement Construction." Update version Sep. 15, 2010. <http://web.archive.org/web/20110309125047/http://www.fhwa.dot.gov/publications/research/infrastructure/structures/97148/cfa53.cfm>. Accessed Oct. 1, 2014.*
Apr. 30, 2014 Chinese Office Action issued in Chinese Patent Application No. 201180063296.6.
Feb. 20, 2014 European Search Report issued in European Application No. 11 781 929.2.
U.S. Appl. No. 13/283,411, filed Oct. 27, 2011, Glen D. Jukkola et al.
U.S. Appl. No. 61/407,706, filed Oct. 28, 2010, Glen D. Jukkola et al.
Zenz et al., "Fluidization and Fluid-Particle Systems", Reinhold Chemical Engineering Series, Reinhold, NY, 50 pages, 1960.
PCT Search Report and Written Opinion issued in connection with related PCT Application No. PCT/US2011/058245 on Feb. 6, 2012.
PCT Search Report and Written Opinion issued in connection with related PCT Application No. PCT/US2011/058258 on Feb. 17, 2012.
Unofficial English translation of Chinese Office Action issued in connection with related CN Application No. 201180063313.6 on Aug. 15, 2014.
Non-Final Office Action issued in connection with related U.S. Appl. No. 13/283,411 on Nov. 3, 2015.
Final Office Action issued in connection with related U.S. Appl. No. 13/283,411 on Apr. 4, 2016.
US Notice of Allowance issued in connection with related U.S. Appl. No. 13/283,411 on Oct. 4, 2016.

* cited by examiner

CONTROL VALVE AND CONTROL VALVE SYSTEM FOR CONTROLLING SOLIDS FLOW, METHODS OF MANUFACTURE THEREOF AND ARTICLES COMPRISING THE SAME

CROSS-REFERENCE TO RELATED APPLICATIONS

This disclosure claims priority to U.S. Provisional Application No. 61/407,706, filed on Oct. 28, 2010 and to U.S. Provisional Application No. 61/407,741, filed on Oct. 28, 2010 and to U.S. Provisional Application No. 61/407,694, filed on Oct. 28, 2010, the entire contents of which are incorporated herein by reference.

STATEMENT REGARDING FEDERALLY SPONSORED RESEARCH OR SUPPORT

The United States Government has rights in this invention pursuant to a grant having contract No. DE-FC26-OINT41223 from the U.S. Department of Energy/National Energy Technology Laboratory (NETL).

TECHNICAL FIELD

This disclosure relates to an active grid arrangement of solids flow control valves to control ash or solids flow through a moving bed heat exchanger or similar device. This disclosure relates to the solids flow control valve for use in a moving bed heat exchanger, as well as other applications. This disclosure also relates to methods of using the solids flow control valve.

BACKGROUND

Moving bed heat exchangers use valves to control the flow of solids through them. Various types of mechanical valves such as ball valves, gate valves, sluice valves and rotary valves can be used for flow control of the solids. However, these valves have moving parts that contact each other and ash and particles passing through the moving bed heat exchanger, and these parts often undergo wear over time that reduces their ability to control the flow of solids. In addition, closing these valves with the solids in their midst poses problems that pertain to exercising active control when desired.

In addition, special design considerations need to be given to the fact that the components of the valve need to function and survive at extremely high temperatures. The solids (e.g., ash) leaving the moving bed heat exchanger is frequently at temperatures of greater than 1500° F.

It is therefore desirable to develop a flow control system for the moving bed heat exchanger that can control the flow of solids at temperatures of 1500° F. or greater without any wear.

SUMMARY

Disclosed herein is a solids flow control valve comprising a standpipe; a shoe; and a transport pipe; wherein the standpipe is in operative communication with the shoe and lies upstream of the shoe; the standpipe comprising a first end and a second end, where the first end is in contact with a source that contains disposable solids and the second end is in fluid contact with the shoe; the shoe being operative to restrict the flow of the disposable solids; the transport pipe being disposed downstream of the shoe to receive and transport the solids from the shoe.

Disclosed herein too is an active grid arrangement of solids flow control valves comprising a controller comprising a programmable logic device that is in electrical communication with a plurality of solids flow control valves; each solids flow control valve comprising a standpipe; a shoe; and a transport pipe; wherein the standpipe is in operative communication with the shoe and lies upstream of the shoe; the standpipe comprising a first end and a second end, where the first end is in contact with a source that contains disposable solids and the second end is in fluid contact with the shoe; the shoe being operative to restrict the flow of the disposable solids; the transport pipe being disposed downstream of the shoe to receive and transport the solids from the shoe.

Disclosed herein too is a method comprising discharging solids from a heat exchanger through a plurality of solids flow control valves; each solids flow control valve comprising a standpipe; a shoe; and a transport pipe; wherein the standpipe is in operative communication with the shoe and lies upstream of the shoe; the standpipe comprising a first end and a second end, where the first end is in contact with a source that contains disposable solids and the second end is in fluid contact with the shoe; the shoe being operative to restrict the flow of the disposable solids; the transport pipe being disposed downstream of the shoe to receive and transport the solids from the shoe; discharging air into the shoe to fluidize the solids; and transporting the solids to a combustion chamber.

DETAILED DESCRIPTION

Disclosed herein is a solids flow control valve system that controls the flow of high temperature solids (also known as high temperature ash) as they exit a moving bed heat exchanger and are transported to a combustion chamber. The solids flow control valve system controls the flow of high temperature solids as they exit the moving bed heat exchanger, which in turn leads to control of the flow of solids within the moving bed heat exchanger. In an exemplary embodiment, the solids are hot solids and/or ash from the moving bed heat exchanger. The solids flow control valve advantageously has no moving parts, which minimizes maintenance and improves reliability. It may use an air pressure of less than 4 pounds per square inch to facilitate transportation of solids back to a combustion chamber. The solids flow control valve can handle pieces of rubble that are the same size as the valve inlet. The lack of moving parts in the solids flow control valve system makes the valve system easy to construct and to maintain.

Disclosed herein too is an active grid distributor that comprises a plurality of solids control valves for controlling the distribution of high temperature solids as they exit the moving bed heat exchanger and are transported to the combustion chamber. The grid controls the flow of and distribution of high temperature solids in the moving bed heat exchanger. Like the individual solids flow control valves, the active grid distributor has no moving parts, uses gravity and low pressure air to facilitate transportation of solids from the moving bed heat exchanger through the solids flow control valve. It can handle pieces of rubble that are the same size as the grid inlet. The lack of moving parts makes the active grid distributor easy to construct and to maintain.

Figure 1:
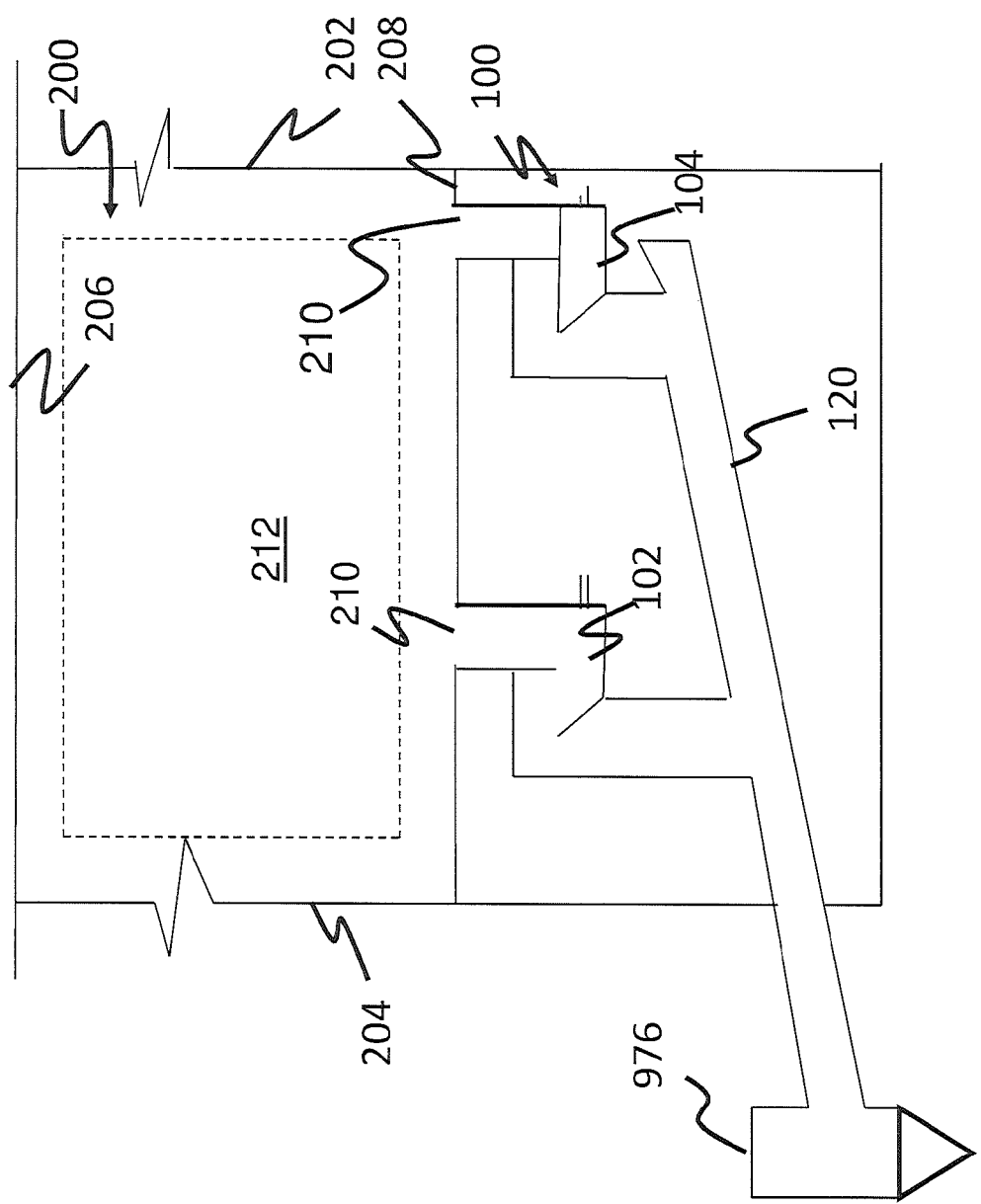
FIG. 1 depicts the solids flow control valve system for a moving bed heat exchanger that comprises a plurality of solids flow control valves.

FIG. 1 depicts the solids flow control valve system 100 for a moving bed heat exchanger 200 that comprises a plurality of valves 102, 104. As will be detailed below in the FIG. 2, each valve 102, 104 comprises a standpipe 112, a shoe 126, and a housing 116. As depicted by the arrows in the FIGS. 1 and 2, hot solids and/or ash from the moving bed heat exchanger 200 travel from the moving bed heat exchanger through the valve 102 into a transport conduit 120 to a combustion chamber 976. With reference to the FIG. 2, the hot solids and/or ash travels from the moving bed heat exchanger 200 through the standpipe 112, the shoe 126 and the housing 116 before entering the transport conduit 120 from which they are transported to the combustion chamber 976. In one embodiment, the combustion chamber 976 may be replaced by a reactor (not shown) or a hopper (not shown) which facilitates disposal of the hot solids and/or ashes.

The solids flow control valve system 100 is disposed downstream of the moving bed heat exchanger 200 and in operative communication with it. The solids flow control valve system 100 is generally located upstream of the combustion chamber 976 (or alternatively the reactor or the hopper). In one embodiment, the solids flow control valve system 100 is disposed directly below the moving bed heat exchanger 200 and contacts an opening in the floor or the moving bed heat exchanger. As shown in the FIG. 1, the moving bed heat exchanger 200 comprises an enclosure 202 that contains a number of tubes (not shown) which are arranged in one or more heat exchanger tube bundles 212. The enclosure 202 is formed by vertical walls 204 of the moving bed heat exchanger, a roof 206 that contacts the vertical walls and a floor 208 that also contacts the vertical walls 204. The moving bed heat exchanger receives hot solids and/or ashes from a boiler cyclone loop seal, the combustion chamber, the reactor, the hopper, or a similar source of hot granular solids.

Figure 2:
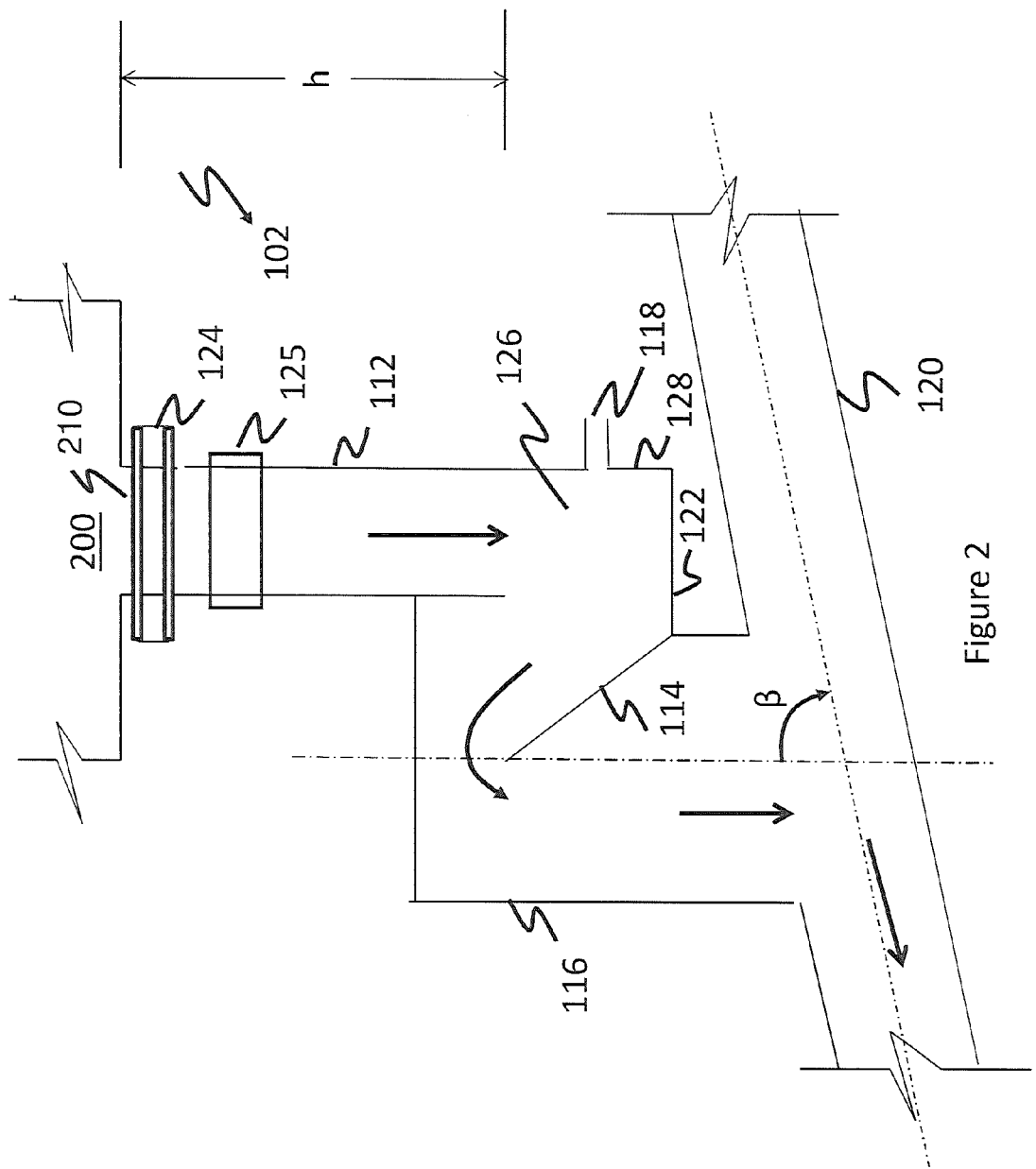
FIG. 2 is an enlarged depiction of the solids control flow valve showing the direction of flow of hot solids and/or ash.

Referring to the FIG. 2, the tube bundles 212 in the moving bed heat exchanger 200 are arranged to remove heat from the hot solids and/or ashes and to transfer it to a cooling medium. The cooling medium is generally water, steam, thermal oil, or heat transfer coolant. The heating or cooling medium flows through the tubes. Cooling medium and product (e.g., hot solids and/or ash) flow occurs in cross, parallel, or countercurrent to each other. The coolers work according to the moving bed principle, i.e., the hot solids and/or ash forms a product column which flows continuously downwards between the cooling tubes. Heat is transferred from the ash or solids through the tube walls to the cooling fluid.

The solids flow control valves 102, 104, and so on contact the floor 208 of the moving bed heat exchanger 200. With respect once again to the FIG. 1, hot solids and/or ash from the moving bed heat exchanger 200 flows downwards between the tubes (not shown) towards the solids flow control valves 102 and 104. The FIG. 2 depicts a single valve 102. The valve 102 comprises a standpipe 112 that is operative to transport hot solids and/or ash from the moving bed heat exchanger 200 to a combustion chamber 976 or to a reactor (not shown) or to a hopper (not shown) via an inclined transport conduit 120. The standpipe also serves as a pressure seal between the higher pressure transport pipe and the lower pressure moving bed heat exchanger. The upper end of the standpipe 112 contacts the floor 208 of the moving bed heat exchanger 200. The floor 208 contains a plurality of holes 210 which are lined up with an opening of the standpipe 112. In other words, the standpipe 112 and the hole 210 are coaxial and are concentrically aligned.

The upper end of the standpipe 112 may contact the floor 208 via an optional flange 124. The flange 124 permits the valve to be removed for maintenance and for replacement if desired. The end of the standpipe 112 opposite the upper end contacts a flow control shoe 126 (hereinafter shoe 126) into which the hot solids and/or ashes that are transported through the standpipe 112 are deposited. The shoe 126 lies downstream of the standpipe 112. The shoe 126 may be a monolithic part of the standpipe 112 or it may be fixedly attached to the standpipe 112 by rivets, by welding, or the like. In one embodiment, the shoe 126 may be reversibly attached to the transport conduit by screw threads or by bolts and nuts. The shoe 126 discharges its contents into a housing 116 and to a transport pipe 120. The transport pipe 120 is located downstream of the shoe 126.

An optional expansion joint 125 may be installed in the standpipe to accommodate thermal expansion differences between the moving bed heat exchanger 208 and the transport pipe 120.

As can be seen in the FIGS. 1 and 2, the standpipe 112 is vertical. However, it is also possible to incline the standpipe at angles other than the vertical. The standpipe generally transports solids from the moving bed heat exchanger to the combustion chamber 976 or reactor or hopper 111 under the effect of gravity and it is therefore desirable for the standpipe to be positioned in such a manner so as to permit gravity to facilitate the movement of solids from the moving bed heat exchanger to combustion chamber 976 or alternatively to a reactor or to a hopper 111. Thus even when the standpipe is inclined at angles other than the vertical, it is desirable for gravity to be able to effect the downward flow of solids.

The height of the standpipe is determined by the design back pressure between the combustion chamber or discharge hopper and the moving bed heat exchanger 200. Back pressures less than the design value will permit ash or solids to be discharged to the transport pipe 120.

Figure 3:
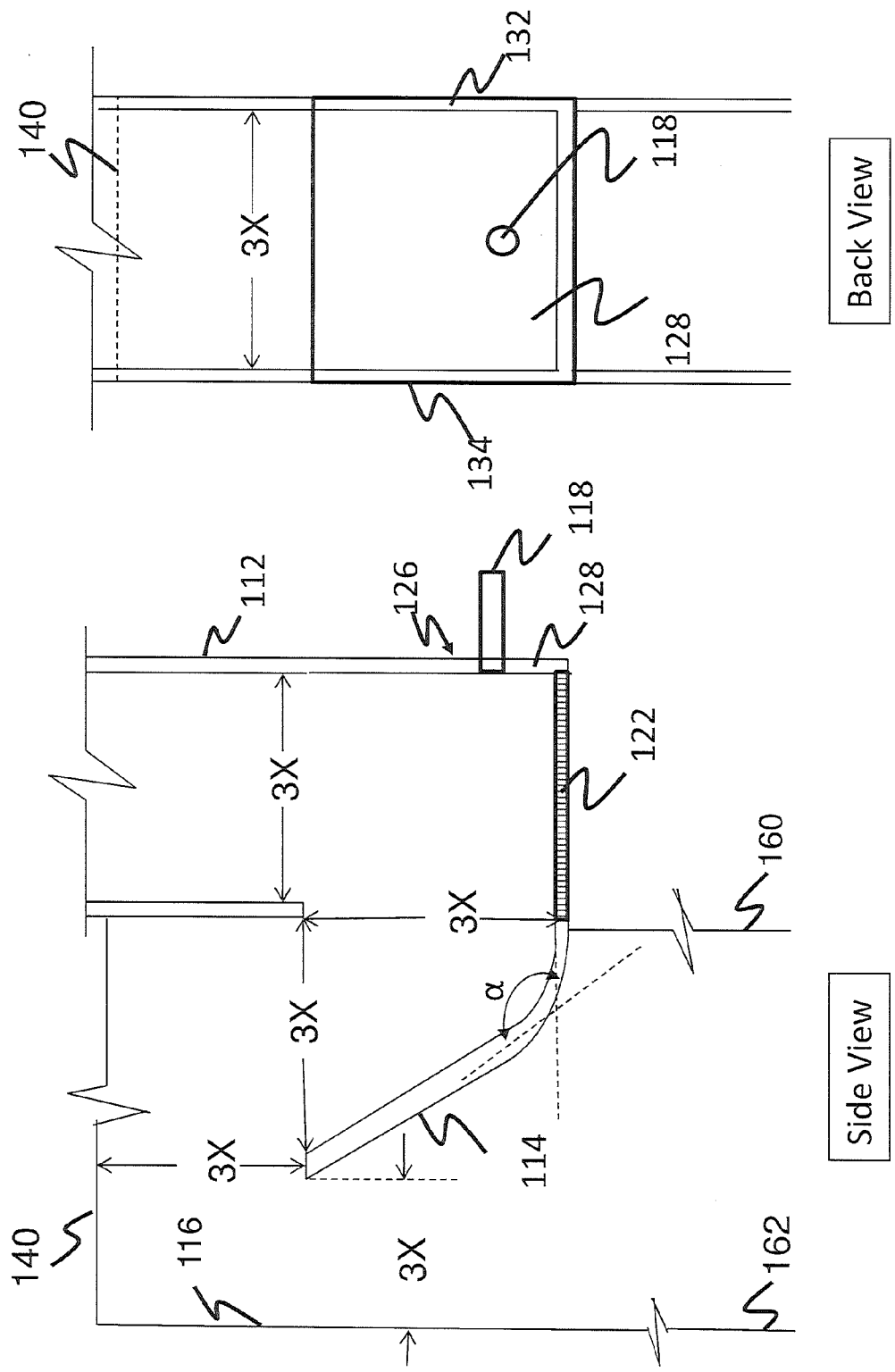
FIG. 3 is an enlarged depiction of the shoe. The FIG. 3 depicts a side view and a back view of the shoe.

The FIG. 3 is an enlarged depiction of the shoe 126. The FIG. 3 depicts a side view and a back view. Neither the side view nor the back view in the FIG. 3 are drawn to scale. The shoe 126 contains a back face 128 (hereinafter the heel 128) that is aligned with the standpipe 112 such that the inner wall of the standpipe is flush with the inner face of the heel 128. Affixed to the heel 128 is a first port 118 containing a sintered frit 127, through which pressurized air may be admitted into the shoe 126. The base of the shoe 126 contains a porous sintered frit 122 through which low pressurized air may be admitted into the shoe 126.

The base of the shoe 126 acts as a temporary restraint to the downwards flow of the hot solids and/or ash. As the hot solids and/or ash flows downwards under gravity, it meets the base of the shoe 126 and begins to pile up in the shoe. The base of the shoe 126 thus acts as a control on the downward flow of hot solids and/or ash.

Opposed to the heel 128 is the toe 114 of the shoe. The shoe 126 has opposing side walls 132 and 134, each of which contacts the heel 128, the base of the shoe and the toe 114 of the shoe. The side walls 132, 134 extend above the top of the toe 114 when measured from the bottom of the base of the shoe 126. A housing 116 completes the shoe 126.

The side walls 132, 134 of the of the shoe form side walls for the housing 116 and contact the roof 140 of the housing. The housing 116 has a front wall 162 and a rear wall 160. The front wall 162 contacts the roof 140 of the housing, while the rear wall 160 contacts the base 122 of the shoe 126 as shown in the FIG. 3. The housing 116 thus prevents hot solids and/or ashes that are transported to the shoe from falling out of the solids control valve system.

As can be seen in the FIG. 3, the passages in the shoe 126, the passages between the toe 114 of the shoe 126 and the roof 140 or walls 160 of the housing 116, and the passages within the housing 116 are at least 3 times greater, specifically at least 5 times greater than the largest debris that are transported through the valve control system. In an exemplary embodiment, the passages in the shoe 126, the passages between the toe 114 of the shoe 126 and the roof 140 or walls 160 of the housing 116, and the passages within the housing 116 are at least 5 times greater than the largest debris that are transported through the valve control system. Having the passages be at least 3 times larger than the largest debris that can be transported in the system, facilitates a smooth movement of the hot solids and/or ashes and prevents clogging of the solids flow control system.

The first port 118 in the shoe 126 serves as an inlet port for pressurized air that is intended to dislodge large debris present in the high temperature solids and/or ash. The hot solids and/or ash that are discharged from the moving bed heat exchanger may contain occasional large debris that can cause clogging of the valves 102, 104. In order to dislodge the debris and in order to maintain a uniform flow of hot solids and/or ashes through the valves 102, 104, pressurized air is periodically discharged through the valves through the first port 118 and also the base 122 at flow rates greater than needed for steady operation. The high pressure air is discharged through the valve for periods of about 5 to about 20 seconds at intervals of about 30 seconds to about 40 seconds.

As detailed above, the base of the shoe 126 contains a porous sintered frit 122 through which low pressurized air may be admitted into the shoe 126. The sintered frit may be manufactured from a ceramic or from a metal that does not react with any of the hot solids, ashes or the hot gases that are discharged through the valve 102. Alternatively, the porous sintered frit may be replaced with a pad of sintered mesh that has a minimal pressure drop. The sintered frit or the pad of sintered mesh may have a pore size of about 3 micrometers to about 10 micrometers. The average particle size of ash particles or hot solids is about 50 to about 200 micrometers and the bulk of these particles cannot pass through the porous frit or the pad of sintered mesh. A drain in the plenum supplying air to the frit permits the evacuation of fines that might pass through the frit.

The presence of a porous frit or a pad of sintered mesh located at the base of the shoe facilitates the uniform flow of hot solids and ash through the shoe because of a stream of low pressure air admitted into the shoe via the porous frit or the mesh 122. The low pressure air fluidizes the hot solids or ash and facilitates the uniform transportation of hot solids and/or ash from the shoe 126 into the transport pipe 112. The stream of low pressure air may be continuous or may be intermittent.

In one embodiment, the low pressure air may be admitted into the shoe via a portion of the base (i.e., it may be allowed to enter the shoe via the forward portion or through the rear portion of the frit.) In other words, the low pressure air may be admitted into the shoe at a variety of different positions and at a variety of different angles. The low pressure air is generally admitted through the porous sintered frit 122 at a pressure of about 0.08 to about 0.23 kilogram per square centimeter. The toe 114 is opposed to the heel 128 and the inner surface of the toe 114 is inclined to the base by an angle $\alpha$ that is greater than 90 degrees. In one embodiment, the angle $\alpha$ that ranges from about 105 to about 135 degrees.

The housing 116 covers the shoe 126 and directs the hot solids and/or hot ashes from the shoe to the transport pipe 120. The housing 116 is in a protective relationship with the shoe 128 and surrounds the shoe 128. The housing 116 contacts the shoe and the transport pipe and provides a fluid communication pathway between the shoe and the transport pipe. It prevents hot solids and/or ashes from dispersing into the environment around the valves. The transport pipe 120 is inclined at an angle effective to transport the fluidized hot solids and/or fluidized ashes to the combustion chamber 976 or to a hopper 111. The transport pipe is inclined at an angle $\beta$ with respect to a vertical. The angle $\beta$ is varied at an angle of about 60 degrees to about 120 degrees measured clockwise or anti-clockwise with respect to the vertical.

Figure 4:
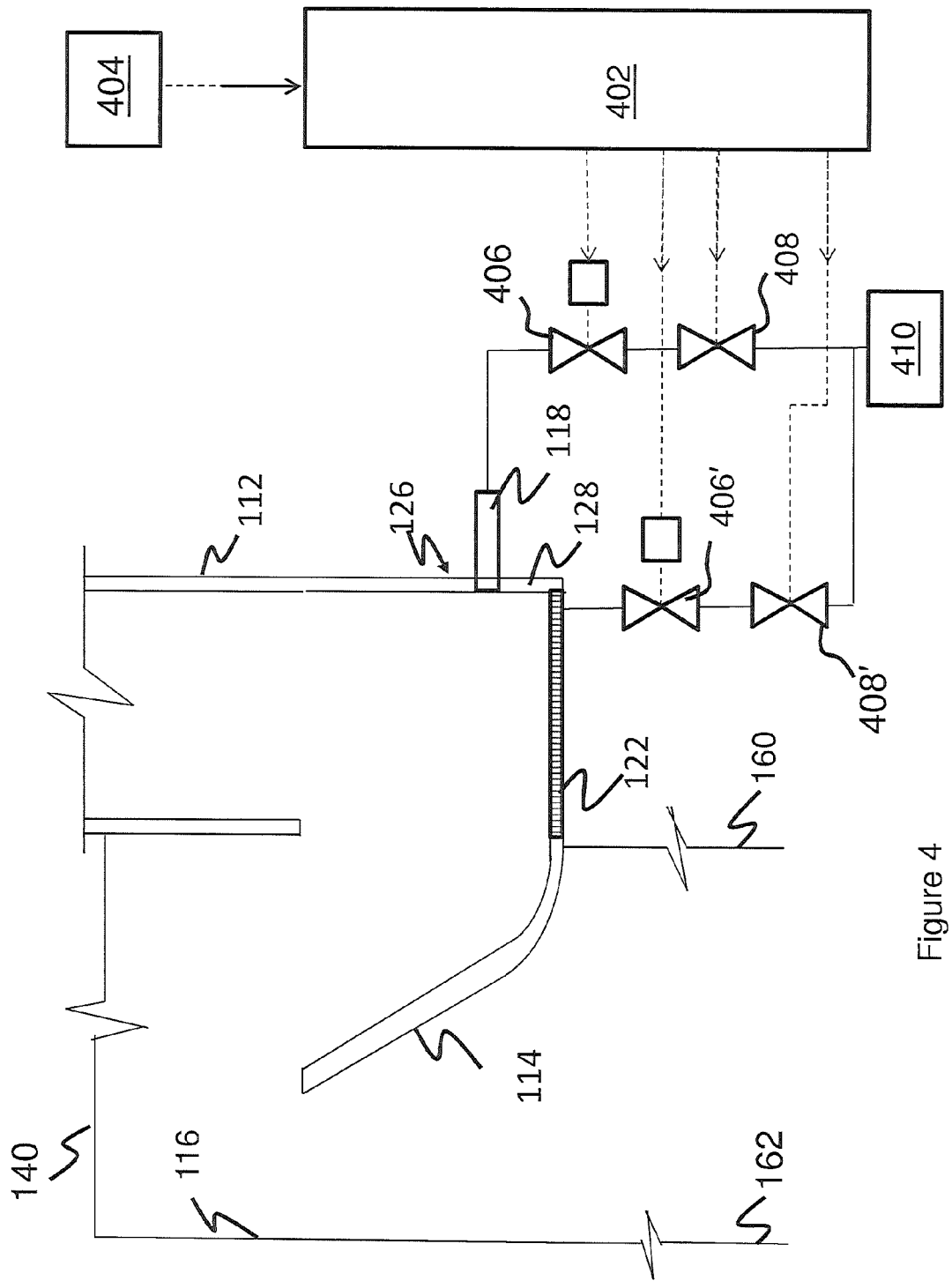
FIG. 4 depicts the active grids solids distributor for controlling a plurality of solids flow control valves.

As can be seen from the FIGS. 2, 3 and 4, the solids flow control valves 102 and 104 function to control the flow of hot solids and/or ash by creating a tortuous pathway between the shoe 126 and the housing 116. The tortuous pathway causes the solids to flow in at least two different directions from the moving bed heat exchanger to the combustion chamber or the reactor or the hopper. As may be seen from the FIG. 2, the hot solids and/or ashes flow in a first direction and upon contacting the base of the shoe, the hot solids and/or ashes change direction and flow in a second direction towards the toe of the shoe. Upon moving across the toe 114 of the shoe, the hot solids and/or ashes once again change direction and flow in a third direction towards the transport pipe 120. The tenuous pathway created in the shoe 126 is thus used to regulate the flow of solids.

The transport pipe 120 may have a diameter of about 25 centimeters to about 500 centimeters. It is to be noted that the transport pipe has a diameter that is at least 3 times, specifically at least 4 times, and more specifically at least 5 times greater than the largest debris that may be transported from the moving bed heat exchanger to the combustion chamber or to the hopper or to the reactor. As may be seen in the FIG. 1, one or more valves may be in operative communication with the transport pipe 120. It is to be noted that while the FIG. 1, depicts two valves, the air flow control valve system may have about 1 to about 50 valves, specifically about 5 to about 25 valves, and more specifically about 4 to about 16 valves. In an exemplary embodiment, the solids flow control valve system has about 16 valves. The number of valves may be dependent on the cross-sectional area of the moving bed heat exchanger 200.

When the solids flow control valve system comprises a plurality of valves, the valves are arranged adjacent to each other in a plurality of rows. Each row is in communication with a transport pipe. As a result, a single or plurality of transport pipes may be used to connect the plurality of rows of valves with the combustion chamber or with a hopper.

In one exemplary embodiment, when an air flow control valve system has 16 valves, the valves may be arranged in 4 rows each having 4 valves. The system will then have 16 standpipes, 16 shoes and 16 covers, each standpipe being associated with a shoe and a cover. The 4 valves in each row will be connected to a transport pipe 120. The system will have 1 or 4 transport pipes, each of which will transport the solids or ashes to the combustion chamber or to the hopper.

The standpipe, the shoe, the housing, the transport pipe are all manufactured from materials that do not react with the hot solids or gases produced in the combustion chamber. The parts of the valve may be manufactured from metals, refractories, or a combination thereof. Metal parts that are coated with ceramics can also be used.

The valve system disclosed herein has a number of advantages. It has no moving parts as a result of which maintenance is greatly reduced over other comparable valves that have moving parts (e.g., ball valves, gate valves, sluice valves).

A wide range of ash or solids flow control is obtained by a digital sequencing of the air supplied to the valves 102, 104. The pressurized air is discharged through the valve for periods of about 5 to about 20 seconds at intervals of about 30 seconds to about 40 seconds. The precise intervals depend on the desired ash flow through the valves. The valves can be sequenced or operated individually to provide the desired ash flow and ash distribution through the moving bed heat exchanger standpipe As the back pressure changes, the ash flow through the ash flow control valve system does not change. The system is thus self-controlling by the air supply sequencing described above. The back pressure limit is controlled by the ash bulk density and the height "h" of the standpipe above the shoe inlet. By setting the height "h" of the standpipe the flow rate of the hot solids and/or ashes can be controlled by adjusting the air flow to ports 118 and 122.

The plurality of solids flow control valves 102, 104, and so on, provide a uniform ash flow profile through the moving bed heat exchanger by controlling the flow of each flow control valve. It also allows for the use of a plurality of solids flow control valves, because it enables operation of the solids flow control valves in such a manner as to effect a uniform solids flow control through the valves. This in turn allows for uniform solids flow across the moving bed heat exchanger and for a uniform temperature profile across the moving bed heat exchanger.

The active grids solids distributor allows for control of the flow of hot solids and/or ash through the moving bed heat exchanger with no moving parts, can use low pressure control and transport air from a primary air (PA) or secondary air (SA) fan (not shown), and can accommodate and pass the occasional piece of oversize rubble through the ash control valve. The active grid solids distributor is reliable because it has no moving parts, which minimizes maintenance and improves reliability.

The ash flow through an individual solids flow control valve is controlled by pulsing of air flow through the valve. Digital air flow control may be accomplished via the programmable logic controller. The programmable logic controller may use a microprocessor computer or a distributed control system. Secondary means of solids flow control can be attained by varying the control air flow rates during each pulse. The heat transfer of the moving bed heat exchanger tube bundle is not affected by this intermittent flow of ash.

The active grids solids distributor refers to a plurality of ash control valves that are operated in a prescribed manner to control the total solids flow rate and solids flow distribution throughout the moving bed heat exchanger. The activation air flow is alternated among each of the solids flow control valves in the active grids solids distributor in a prescribed pattern so that each ash control valve in succession is actuated.

Flow control variation between the ash control valves is obtained by changing the time for air flow activation for each ash control valve. The total hot solids and/or ash flow through the moving bed heat exchanger is controlled by the dwell time between activation for each ash control valve.

A programmable logic controller is in electrical communication with the solids flow control valve system and is used to set the air flow sequences for the ash control valves. The programmable logic controller may be a microprocessor, a computer, or the like. The activation and dwell times for the ash control valves can be adjusted to smooth out imbalances in solids flow through the moving bed heat exchanger. Depending upon the tube bundle arrangement in the moving bed heat exchanger, it may also be used to bias the solids flow distribution in the moving bed heat exchanger for coolant temperature control.

The FIG. 4 is a depiction of the active grids solids distributor 400. The active grids solids distributor 400 comprises programmable logic controller 402 in electrical communication with a temperature measuring device 404, a first solenoid valve 406, a second solenoid valve 406', a first air flow control valve 408 (that controls air flow to the solids flow control valves 102, 104, and so on), a second air flow control valve 408' and a fan (not shown) or a pump 410. The fan or pump 410 is operative to discharge air (such as the primary air source of the combustion chamber) into the shoe via the first port 118 or via the base 122. The air from the fan or the pump 410 is discharged via the first air flow control valve 408 and the first solenoid valve 406 into the first port 118 of the shoe 126 or via the second air flow control valve 408' and the second solenoid valve 406' into the base 122 of the shoe 126. The first solenoid valve 406 and the second solenoid valve 406' functions as an "on-off" valve, while the first air flow control valve 408 and the second air flow control valve 408' is operative to allow for the control of the effective flow of air to the shoe 126. Temperature information from the moving bed heat exchanger is received by the programmable logic controller 402, which then activates air to the respective solid flow control valves 102, 104, and so on.

In one embodiment, in one method of functioning of the active grids solids distributor 400, the temperature at various points in the moving bed heat exchanger 200 or the inlet and outlet fluid temperature of the fluid flowing into the tube bundles 212 is fed to the programmable logic controller 402. Depending upon the temperature profile in the moving bed heat exchanger 200, the programmable logic controller 402 may activate the air flow control valve 408 and the solenoid valve 406 to actuate the flow of solids in a particular solid flow control valve 102 or 104 and so on. As noted above, there may be a plurality of valves in the solids flow control valve 408. The programmable logic controller 402 may use a variety of different forms of logic to control the solids flow control valves in the solids flow control system. The operation of the active grids solids distributor 400 and the solids flow control valves are discussed in further detail below. While the active grids solids distributor 402 is shown functioning as a closed loop system, one of ordinary skill in the art would understand that the system may operate in an open loop mode.

The actuation of the valves may be based upon a variety of parameters such as the temperature of water or steam in one or more pipes, the flow rate of water or steam in one or more pipes, the temperature profile of the moving bed heat exchanger, the load on the boiler, the ash profile, the desires of a particular user, the overall system profile, or the like, or a combination of at least one of the foregoing parameters.

The active grid solids distributor can control 1 to about 50 valves, specifically about 5 to about 25 valves, and more specifically about 4 to about 24 valves. In an exemplary embodiment, the active grid solids distributor can control hot solids and/or ash flow in an ash valve control system having about 16 valves. It is generally desirable to have an even number of valves.

In one exemplary embodiment, an active grid solids distributor can control 16 ash control valves. In one manner or functioning, the active grid solids distributor will permit low pressure air in the first valve of the 16 valves for a period of about 3 to about 15 seconds, specifically about 5 to about 10 seconds, after which it is turned off for a period of 15 to about 50 seconds, specifically about 20 to about 30 seconds.

Upon turning off the first valve, the active grid solids distributor will permit low pressure air in the second valve of the 16 valves for a period of about 3 to about 15 seconds, specifically about 5 to about 10 seconds, after which it is turned off for a period of 15 to about 50 seconds, specifically about 20 to about 30 seconds. In this manner, the active grid solids distributor turns all 16 valves on and off sequentially, or in parallel. The process is then repeated.

In one embodiment, the valves may be activated sequentially in rows or in columns. For example, the valves in the first row or first column may be activated prior to the valves in the second row or second column. In another embodiment, the valves in a plurality of rows or columns may be activated simultaneously prior to the valves in another plurality of rows or columns being activated simultaneously. In another embodiment, the valves in all of the rows or all of the columns may be activated simultaneously. The aforementioned sequences may be used for either the low pressure air or the high pressure air or for both of them. The low pressure air and the high pressure air may be alternated in a variety of sequences for the valves in different rows or in different columns. In yet another embodiment, the valves may be activated in any desirable sequence. As discussed hereinbefore, the sequence of activation of the valves may be dependent on an input parameter to the controller 402 of function in an open loop mode with a predetermined sequence.

As noted above, this method of controlling the hot solids and/or ash flow maintains a uniform distribution of temperature across the moving bed heat exchanger. It is to be noted that the solids flow control valves and the active grid solids distributor can be used in other types of heat exchangers where heat is to be extracted from hot solids and/or ash. It can also be used in other industries where control of solids flow is desired. For example, it can be used in industries involved in the manufacture of metals such as steel and aluminum, where irregularly shaped solids are to be charged to a furnace.

The following examples, which are meant to be non-limiting illustrate the solids flow control valve system and the active grid solids distributor.

EXAMPLE

Example 1

This example depicts the functioning of the solids flow control valve and the solids flow control valve system. This example details the solids flow control valve and its operation using a low pressure air source.

A commercial moving bed heat exchanger having a square cross-sectional area with sides of approximately 16 feet×16 feet size was selected as a base for this experiment. A slice model was constructed to demonstrate the use of the ash control valve grid to control the ash flow through the slice. A series of nozzles were located under the slice model to connect with ash control valves. The ash control valves and the moving bed heat exchanger used for this experimental set-up are similar to that shown in the FIG. 1. The ash control valves were pneumatically actuated by a low-pressure air system. As explained above, each ash control valve was supplied with fluidizing air through a sintered mesh at the bottom or sole, and at the bottom of the inlet dip leg or heel.

A house compressed air supply passed through a pressure-reducing valve to provide an air flow at 60 inches of water gage pressure. Several ash control valves could be fed by the air supply. Four ash control valves with two admission ports each were connected to the air supply. Each port had a flow control valve and an isolation ball valve to control airflow to the port. This permitted the flow to a single port to be set to a desired value and then turned on or off by the isolation ball valve without disturbing the flow setting.

Two air admission ports were used to provide maximum ash flow rates; a bottom or sole air-port, and a standpipe or heel air-port. Initially several single openings of various orientation were tried for the air-port in order to determine the optimum location.

The air ports were supplied with a pad of sintered mesh having minimal pressure drop and a pore size of the order of 5 micrometers. The pads were recessed in the bottom of a ¼ inch deep opening and as such did not see the stream of ash flowing through the ash control valve. The use of the sintered pads with air flowing therethrough prevented backsifting of the ash into the air supply plenum.

Each solids flow control valve discharged solids and/or ashes into a 2 inch transport pipe. The solids/and or ashes were discharged into a receiving hopper, which served as a replacement for the combustion chamber.

Ash flow control by the ash control valve was basically on or off. Minor ash flow control could be obtained by adjusting the air flows. However in order to pass rubble through the ash control valve, the air flows needed to be maintained at high flow settings. Low ash flows were obtained by a digital on-off operation of the valves (typically 5 seconds with the air flow on followed by 25 second with the air flow off). If the on-off ratio was adjusted, the average ash flow would correspondingly change. The moving bed heat exchanger tube bundle heat transfer was not affected by this intermittent flow of ash.

Example 2

This example was conducted to demonstrate how the height "h" and diameter of a standpipe can be used to control the back pressure in the solids flow control valve. The height of the standpipe above the shoe determines how much back pressure can develop in the system. The height of the standpipe was increased by 10 inches with a 1.88 inch inner diameter tube extension into the slice model to provide increased backpressure flow capability.

Multiple ash control valves were tested, all discharging into a common return transport tube as shown in FIG. 1. The ash control valves were of 2 inches dip leg size and of 3 inches dip leg size respectively. The size difference was selected to provide a size scale up for the ash control valve. The solids flow control valves all discharged into the 2 inch transport pipe. Several angles of inclination β from 15 degrees to 330 degrees for the transport pipe were evaluated. Two sizes of ash control valves were tested—a 2 inch diameter standpipe and a 3-inch diameter standpipe. Both sizes discharged into a 2-inch inner diameter transport pipe.

Figure 5:
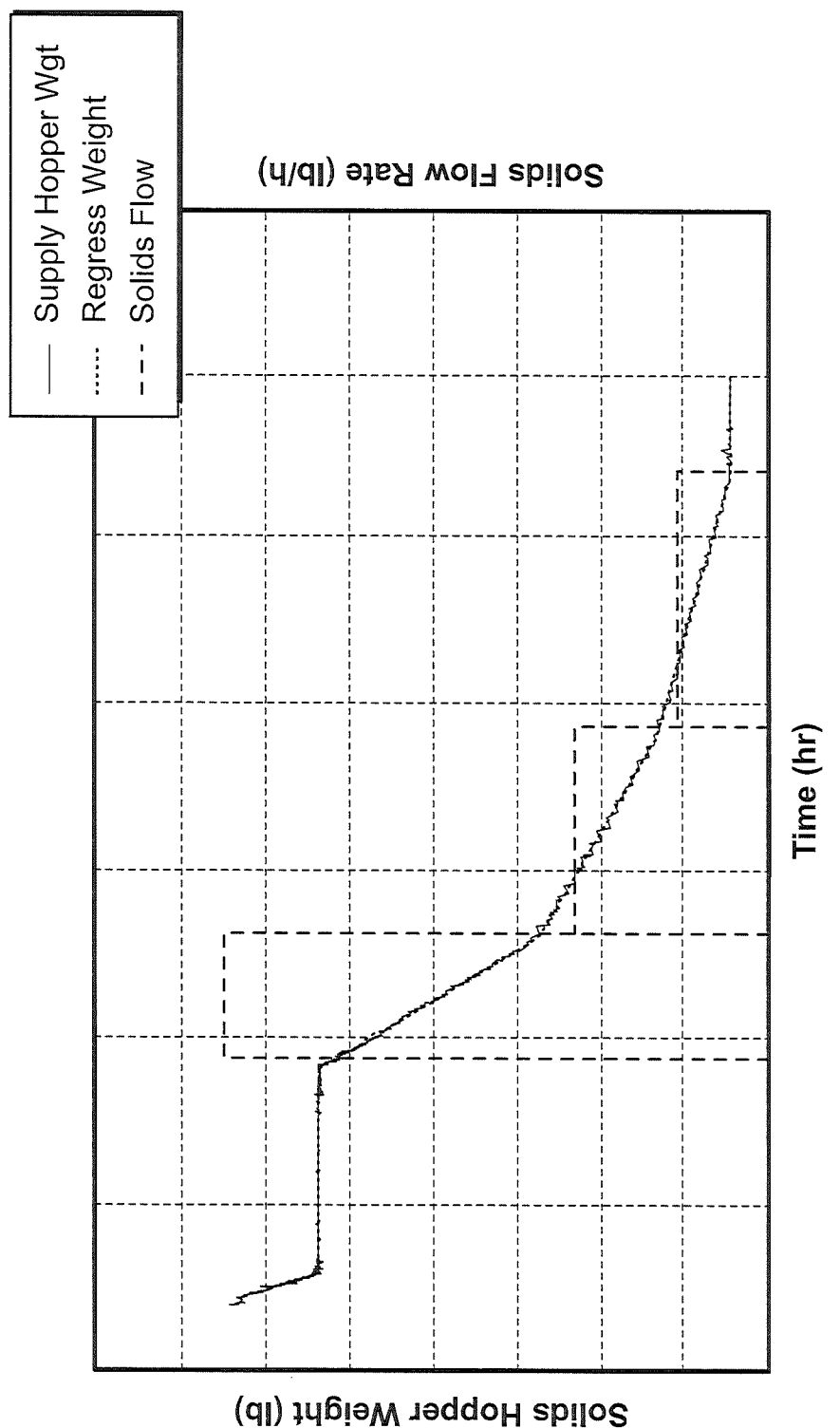
FIG. 5 is a graphical depiction of the solids flow control valve using the digital pulse method.

Control air sequencing for the ash control valve and standpipe is shown in the FIG. 5. Low range pressure regulating valves were connected to a house compressed air supply. This provided an adjustable supply pressure for the ash control valves and for the transport pipe. The pressure regulators were set for ranges from 60 inches of $H_2O$ to 120 inches of $H_2O$ depending on the test requirements. Air flow to the ash control valve was measured by an orifice meter. Air flow to the transport tube was measured by a separate orifice meter having.

Air flowing from the measurement orifice to the base of the solids flow control valve (the sintered pad) and heel ports (the first port) was controlled by a inch pipe needle valve and a inch ball valve. The major pressure drop in the air supply system was in the needle valve. The needle valve for each ash control valve was set with the others isolated by their ball valves so that the orifice meter measured the flow to that particular ash control valve. The needle valves were successively set for each port on each ash control valve and unchanged during a test.

The primary characteristic of the ash control valve was the control of the sequential air flow rates needed for activation, the subsequent solids flow rate, the influence of the transport pipe inclination, and the effect of rubble or oversize particles on performance. Ash flow rate control by an ash control valve is primarily an on-off process. Secondary control is attained by varying the control air flow rates. The primary control method for moving bed heat exchanger application was to pulse the ash control valve by a digital air flow control, resulting in pulsed solids flow control. This pulsed flow control did not have a significant effect on heat transfer.

Figure 6:
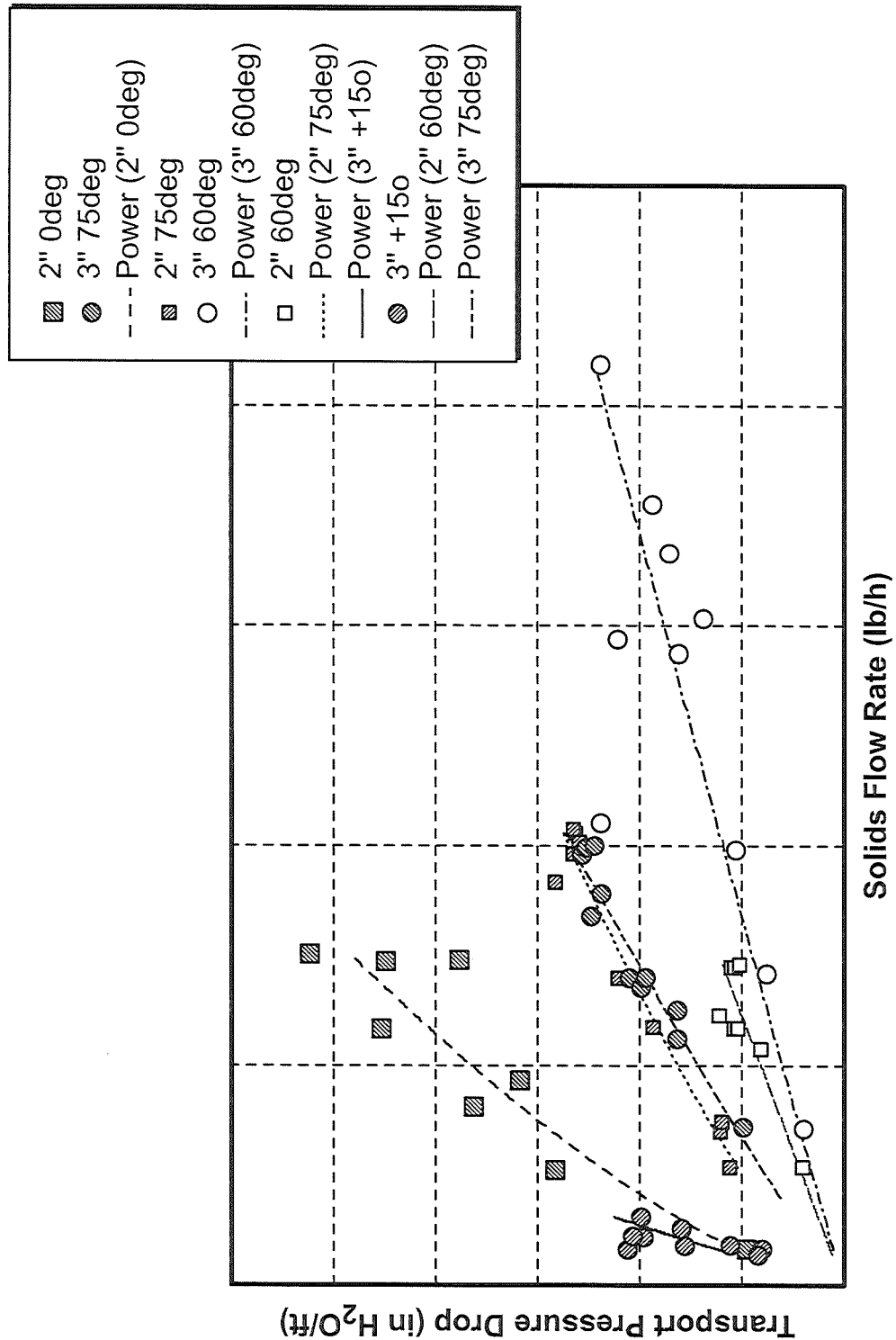
FIG. 6 is a graphical depiction of the average solid control valve transport duct pressure drop versus the ash flow rate for various solid control valve sizes and transport duct inclination.

The results of the inclination angle and size are shown in FIG. 6. FIG. 6 shows all graphical depictions of the average ash control valve transport duct pressure drop versus the ash flow rate for various ash control valve sizes and transport duct inclination. The ash control valve control air was on continually at the beginning of the test, then was digitally pulsed 10 seconds on followed by 20 seconds off, then was pulsed 5 seconds on followed by 25 seconds off.

Figure 7:
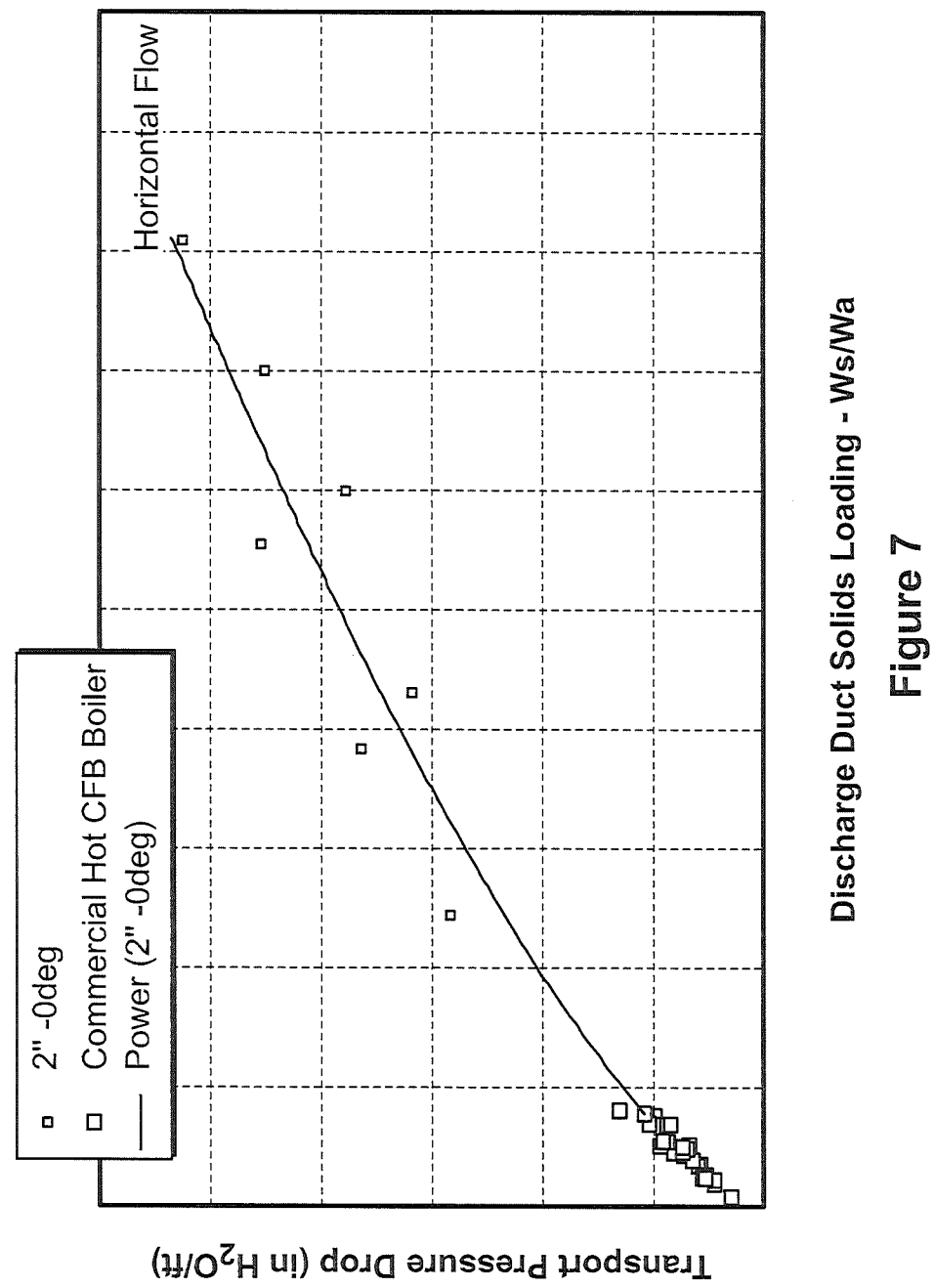
FIG. 7 is another graphical comparison of laboratory experimental results with results from an application of the solids control valve to a commercial operating circulating fluidized bed boiler.
Figure 8:
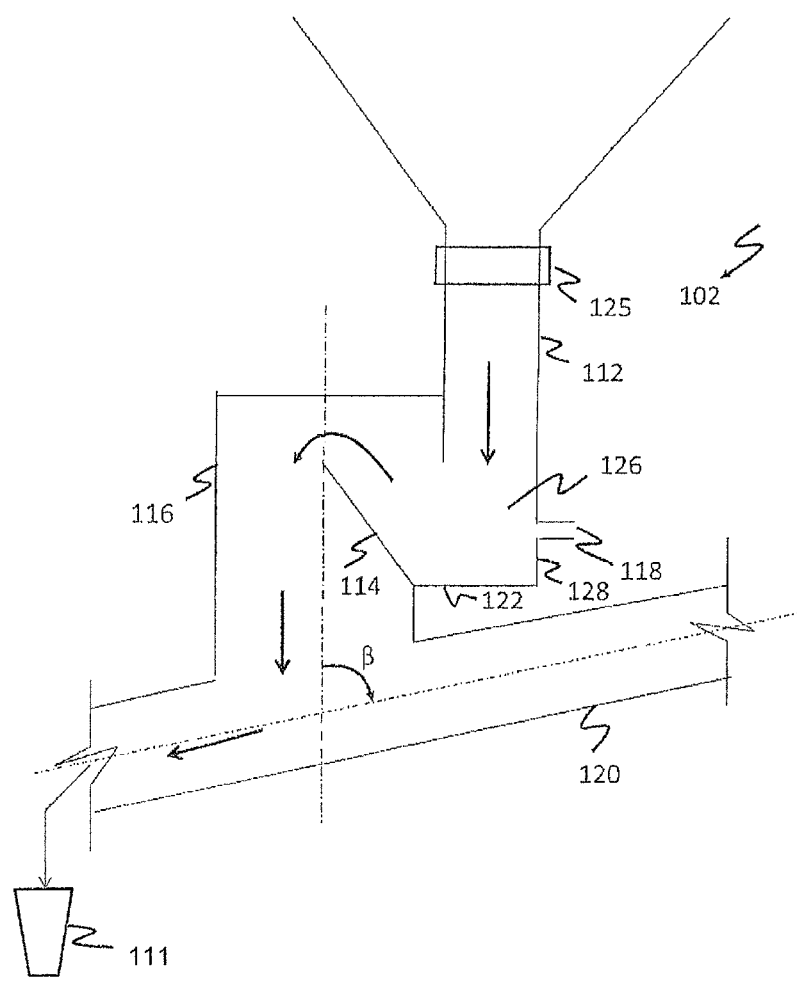
FIG. 8 is an enlarged depiction of the solids control flow valve showing the direction of flow of hot solids and/or ash.
Figure 9:
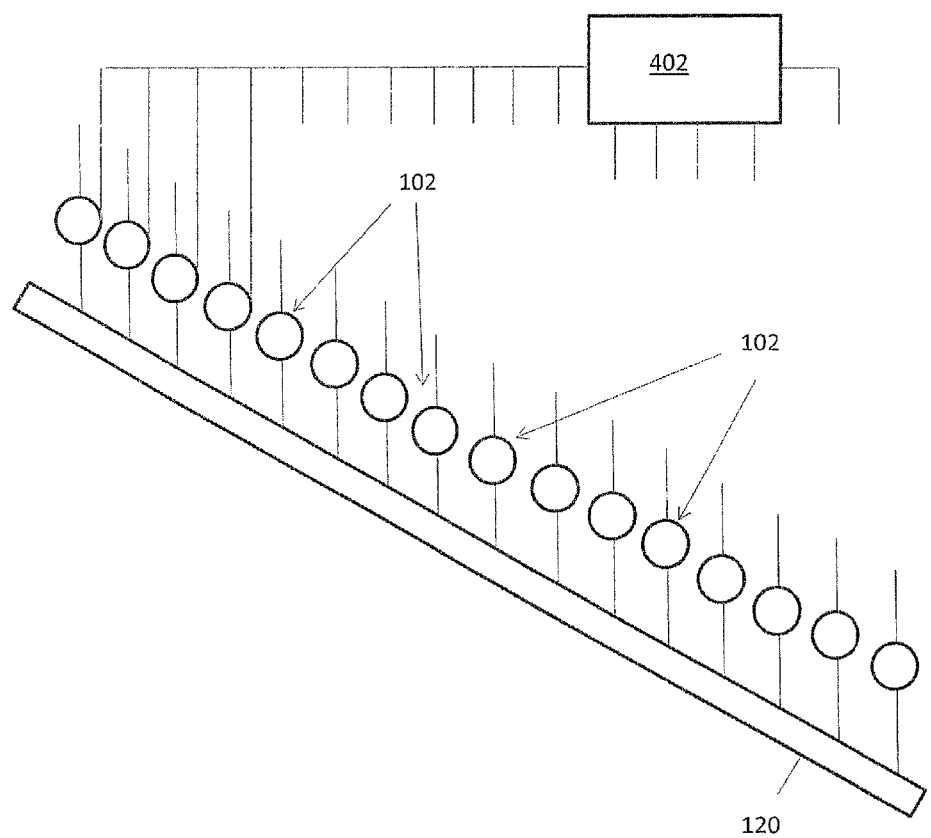
FIG. 9 depicts a plurality of valves and a transport conduit.
Figure 10:
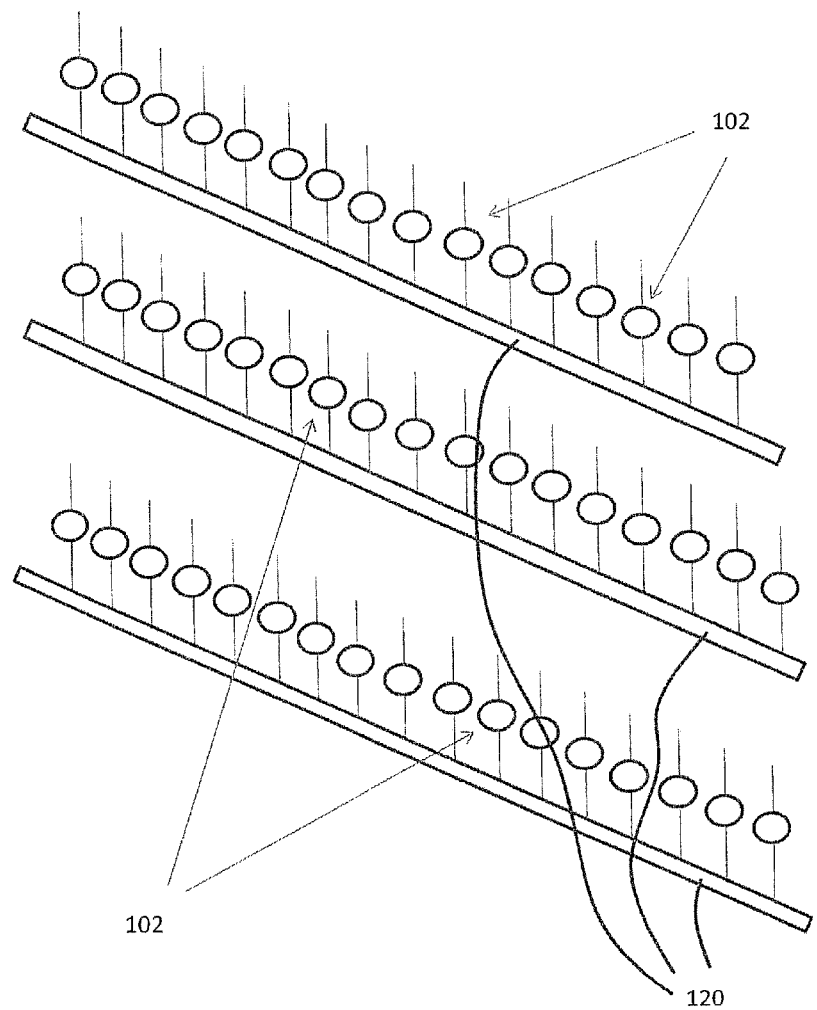
FIG. 10 depicts a plurality of valves and transport conduits.
Figure 11:
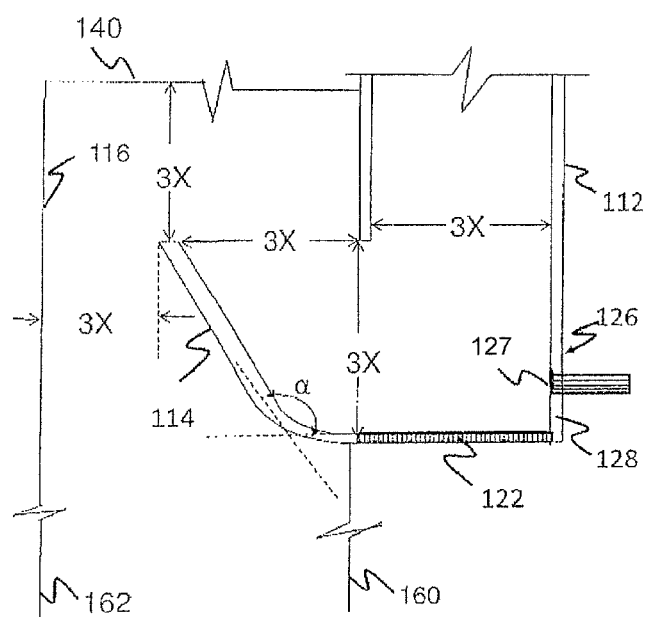
FIG. 11 is an enlarged depiction of the shoe.
Figure 12:
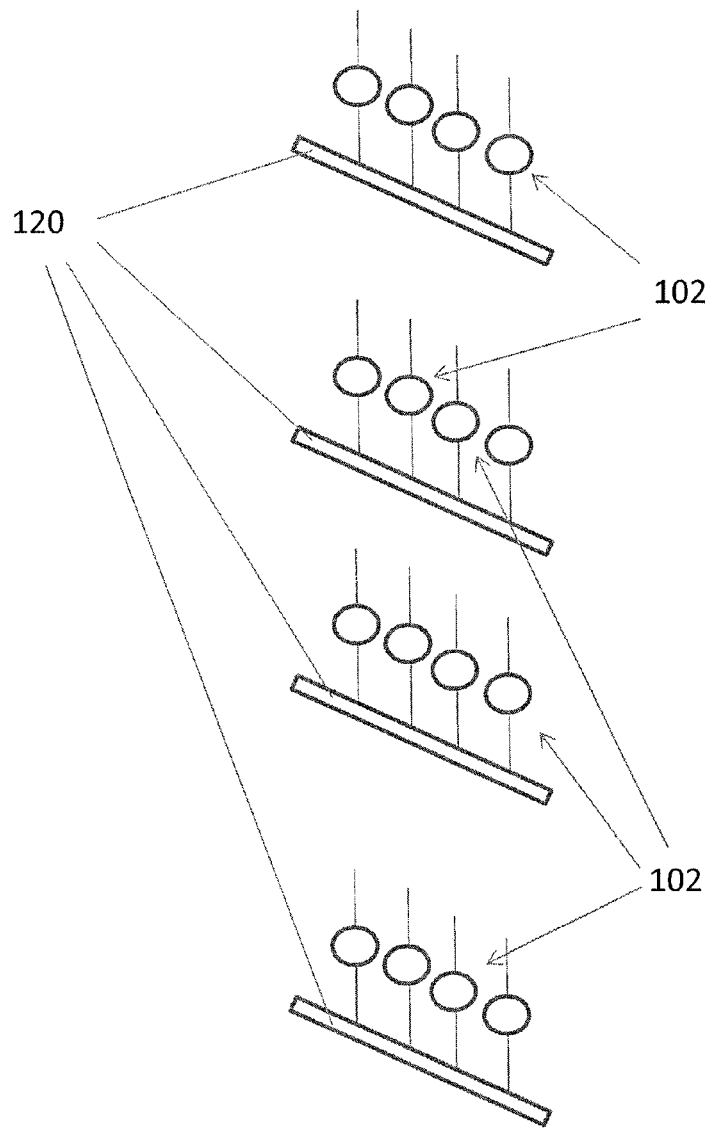
FIG. 12 depicts a plurality of valves and a plurality of transport conduits.

From the FIG. 7 it may be seen that increased solids flow resulted in an increased transport pressure drop. The transport pressure drop limited the solids flow rate. The standpipe height "h" above the ash control valve determined the maximum backpressure against which the ash control valve could transport solids.

From the figures above, it may be seen that very little air was needed for control. The solids to air ratio for the ash control valve was determined to be of the order of 400 to 20,000 pounds solids/pound of air. This translates to about 20 to about 150 pounds per hour per square foot based on the standpipe cross-sectional area. In effect, the solids would flow if enough air was supplied to fluidize the material in the standpipe and the standpipe was of sufficient height.

From the FIG. 6, it may be seen that a pneumatic solids flow control valve can effectively control the flow rate and meet the capacity requirements of a moving bed heat exchanger. The final configuration tested contained sintered mesh control air fluidizing pads. Air injection ports without the sintered mesh pads were subject to ash backsifting and loss of flow capacity. The sintered pads never experienced backsifting or loss of flow.

These experiments also showed that a standpipe above the ash control valve was desirable as it serves as a pressure boundary seal. The height requirement of the standpipe was seen to be dictated by the ash density and backpressure. Backpressure would be governed by the combustion chamber-cyclone pressure differential and by the inclination of the transport pipe. Minimal backpressure is provided by transport pipes that have an inclination β of 60 to 120 degrees from a vertical (see FIG. 2).

These examples also show that low pressure primary air could be used for control activation of the ash control valve, and for transport of the ash from the ash control valve to the combustion chamber, provided that transport pipes are sloped downward at an angle of inclination β of 60 to 120 degrees measured from a vertical. The solids flow control valves can transport from about 20,000 to about 400,000 pounds per hour per square foot of hot solids and/or ash with an ash to air weight ratio of 2000 or greater.

Example 3

A hot field test was conducted at an operating circulating fluidized bed (CFB) boiler site to demonstrate that the above concepts could be put into commercial practice. A moving bed heat exchanger slice model of 0.46 meter by 2.1 meter plan area cross section was installed to receive a slip stream of hot recycled ash from the CFB boiler. Two ash control valves with dip leg diameters of 0.15 meter discharging into a common return duct of 0.25 meter diameter. The moving bed heat exchanger and control valves were operated for an extended period of several cumulative months to demonstrate the ability to transfer design criteria from ambient conditions to hot operating conditions for an extended period of time.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The term "and/or" is construed to mean both "and" as well as "or". The expression A and/or B is therefore construed to mean A and B as well as A or B. The expression A, B and/or C is construed to mean A, B and C as well as A or B or C.

While the invention has been described with reference to a preferred embodiment and various alternative embodiments, it will be understood by those skilled in the art that changes may be made and equivalents may be substituted for elements thereof without departing from the scope of invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A solids flow control valve comprising:
   a standpipe;
   a shoe;
   a transport pipe, wherein the standpipe is in operative communication with the shoe and lies upstream of the shoe, the standpipe includes a first end and a second end, the first end is in contact with a source that contains disposable solids, the second end is in fluid contact with the shoe, and the shoe being operative to restrict the flow of the disposable solids;
   the transport pipe being disposed downstream of the shoe to receive and transport the solids from the shoe; and
   a housing that is in a protective relationship with the shoe and surrounds the shoe, and the shoe includes a heel, a base and a toe, wherein the heel, the base and the toe each contact one another, with the toe being inclined to the base at an internal angle that is within a range of 105 to 135 degrees, and the toe has substantially the same vertical footprint as the heel,
   wherein the shoe includes at least two ports for admitting a pressurized fluid, at least one of the ports is located at the heel, while at least one of the ports is located at the base of the shoe, the port at the base of the shoe contains a porous sintered frit that is configured to allow low pressurized air to enter into the shoe, and the port at the heel of the shoe contains a sintered frit that is configured to allow pressurized air to enter into the shoe, and
   wherein the port at the base of the shoe is positioned substantially directly beneath the standpipe and is configured to direct the low pressurized air into the shoe in a direction substantially opposite an inlet flow direction of the disposable solids from the standpipe into the shoe.

2. The solids flow control valve of claim 1, wherein the solids flow control valve communicates with a heat exchanger and lies downstream of the heat exchanger.

3. The solids flow control valve of claim 1, wherein the solids flow control valve communicates with a combustion chamber and lies upstream of the combustion chamber.

4. The solids flow control valve of claim 1, wherein the standpipe is inclined to a vertical direction.

5. The solids flow control valve of claim 1, wherein the housing contacts the shoe and the transport pipe and provides a fluid communication pathway between the shoe and the transport pipe.

6. The solids flow control valve of claim 1, wherein pressurized air having a pressure of about 0.08 to about 0.23 kilograms per square centimeter is intermittently introduced into the port located at the heel of the shoe.

7. The solids flow control valve of claim 6, wherein the pressurized air is admitted into the shoe intermittently for solids flow rate control, and the pressurized air is admitted for a period of about 3 to about 10 seconds and then shut off for a period of about 5 to about 30 seconds.

8. The solids flow control valve of claim 1, wherein the transport pipe is in communication with a combustion chamber or a receiving hopper.

9. The solids flow control valve of claim 1, wherein the solids include ash derived from the combustion of a carbonaceous fuel.

10. The solids flow control valve of claim 1, wherein the transport pipe is horizontal or is inclined with respect to a vertical, and the solids flow control valve contains no parts that move relative to other parts of the valve.

11. A solids flow control system comprising a plurality of solids control valves of claim 1.

12. The solids flow control system of claim 11, wherein the system includes 1 to 50 valves.

13. The solids flow control system of claim 11, wherein the system includes 16 solids control valves.

14. The solids flow control system of claim 11, wherein a plurality of solids control valves are in communication with a single transport pipe.

15. The solids flow control system of claim 14, wherein the system includes a plurality of transport pipes, and each transport pipe is in communication with the plurality of solids control valves.

16. An active grid solids distributor comprising:
a controller including a programmable logic device that is in electrical communication with a plurality of solids flow control valves; each solids flow control valve includes:
   a standpipe;
   a shoe that includes a heel, a base and a toe, wherein the heel, the base and the toe each contact one another, with the toe being inclined to the base at an internal angle within a range of 105 to 135 degrees, and the toe has substantially the same vertical footprint as the heel;
   wherein the shoe includes at least two ports for admitting a pressurized fluid, at least one of the ports is located at the heel, while at least one of the ports is located at the base of the shoe, the port at the base of the shoe contains a porous sintered frit that is configured to allow low pressurized air to enter into the shoe, and the port at the heel of the shoe contains a sintered frit that is configured to allow pressurized air to enter into the shoe,
   wherein the port at the base of the shoe is positioned substantially directly beneath the standpipe and is configured to direct the low pressurized air into the shoe in a direction substantially opposite an inlet flow direction of disposable solids from the standpipe into the shoe;
   a transport pipe, wherein the standpipe is in operative communication with the shoe and lies upstream of the shoe, the standpipe includes a first end and a second end, the first end is in contact with a source that contains the disposable solids, the second end is in fluid contact with the shoe, and the shoe being operative to restrict the flow of the disposable solids;
   a housing that is in a protective relationship with the shoe and surrounds the shoe, the housing extending substantially vertically from the shoe between the shoe and the transport pipe, and in a direction substantially parallel to the standpipe, the housing being configured to receive the disposable solids from the toe of the shoe and to direct the disposable solids from the shoe to the transport pipe; and
   the transport pipe being disposed downstream of the shoe to receive and transport the solids from the shoe.

17. The active grid solids distributor of claim 16, wherein at least one valve of the plurality of valves is first actuated prior to actuating another valve, and the actuation includes turning on pressurized air in at least one valve for a period of time before turning it off.

18. The active grid solids distributor of claim 16, wherein the active grid is actuated by turning on the air for at least one valve intermittently for solids flow rate control that includes air admission for a time period of about 3 to about 15 seconds and turning it off for a time period of about 15 to about 50 seconds.

19. The active grid solids distributor of claim 16, wherein the transport pipe is horizontal or is inclined with respect to a vertical, and the solids flow control valve contains no parts that move relative to other parts of the valve.

20. A method comprising:
discharging solids from a heat exchanger through a plurality of solids flow control valves; each solids flow control valve includes:
   a standpipe;
   a shoe that includes a heel, a base and a toe, wherein the heel, the base and the toe each contact one another, with the toe being inclined to the base at an internal angle within a range of 105 to 135 degrees, and the toe has substantially the same vertical footprint as the heel;
   wherein the shoe includes at least two ports for admitting a pressurized fluid, at least one of the ports is located at the heel, while at least one of the ports is located at the base of the shoe, the port at the base of the shoe contains a porous sintered frit that is configured to allow low pressurized air to enter into the shoe, and the port at the heel of the shoe contains a sintered frit that is configured to allow pressurized air to enter into the shoe,
   wherein the port at the base of the shoe is positioned substantially directly beneath the standpipe and is configured to direct the low pressurized air into the shoe in a direction substantially opposite an inlet flow direction of disposable solids from the standpipe into the shoe;
   a transport pipe, wherein the standpipe is in operative communication with the shoe and lies upstream of the shoe, the standpipe includes a first end and a second end, the first end is in contact with a source that contains the disposable solids, the second end is in fluid contact with the shoe, and the shoe being operative to restrict the flow of the disposable solids;
   the transport pipe being disposed downstream of the shoe to receive and transport the
solids from the shoe;
   a housing that is in a protective relationship with the shoe and surrounds the shoe, the housing extending substantially vertically from the shoe between the shoe and the transport pipe, and in a direction substantially parallel to the standpipe, the housing being configured to receive the disposable solids from the toe of the shoe and to direct the disposable solids from the shoe to the transport pipe;
discharging air into the shoe to fluidize the solids; and
transporting the solids to a combustion chamber or hopper.

21. The method of claim 20, wherein the discharging of the air is due to actuation brought by a programmable logic device.

22. The method of claim 20, wherein the discharging of air into the shoe includes discharging the air intermittently.

23. The method of claim 20, wherein the discharging includes actuating at least one valve of the plurality of valves prior to actuating another valve, and the actuating includes turning on pressurized air in at least one valve for a period of time before turning it off.

* * * * *